US012747192B2

(12) United States Patent
Ding et al.

(10) Patent No.: US 12,747,192 B2
(45) Date of Patent: *Sep. 29, 2026

(54) ENVIRONMENTAL BARRIER COATING

(71) Applicant: RTX CORPORATION, Farmington, CT (US)

(72) Inventors: Zhongfen Ding, South Windsor, CT (US); Xia Tang, West Hartford, CT (US); Michael R. Kracum, Manchester, CT (US); Richard Wesley Jackson, Groton, CT (US); James T. Beals, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 1056 days.

This patent is subject to a terminal disclaimer.

(21) Appl. No.: 16/722,556

(22) Filed: Dec. 20, 2019

(65) Prior Publication Data

US 2021/0188720 A1 Jun. 24, 2021

(51) Int. Cl.
*C04B 41/00* (2006.01)
*C04B 35/56* (2006.01)
(Continued)

(52) U.S. Cl.
CPC ........ *C04B 41/009* (2013.01); *C04B 35/5603* (2013.01); *C04B 35/565* (2013.01); *C04B 41/5024* (2013.01); *C04B 41/52* (2013.01); *C04B 41/87* (2013.01); *F01D 5/284* (2013.01); *C04B 2103/0012* (2013.01); *C04B 2111/00612* (2013.01); *C04B 2235/3418* (2013.01); *C04B 2235/3826* (2013.01); *C04B 2235/3895* (2013.01)

(58) Field of Classification Search
CPC .................................................... C04B 41/009
See application file for complete search history.

(56) References Cited

U.S. PATENT DOCUMENTS 5,132,257 A 7/1992 Kodama et al.
6,331,496 B2 12/2001 Nakayasu
(Continued)

FOREIGN PATENT DOCUMENTS

WO 2015147960 10/2015

OTHER PUBLICATIONS

The Extended European Search Report for European Patent Application No. 20213751.9 dated May 17, 2021.

*Primary Examiner* — Humera N. Sheikh
*Assistant Examiner* — Julia L Rummel
(74) *Attorney, Agent, or Firm* — Carlson, Gaskey & Olds, P.C.

(57) ABSTRACT

An article includes a ceramic-based substrate and a barrier layer on the ceramic-based substrate. The barrier layer includes a matrix of SiO2 and a dispersion of silicon oxycarbide particles in the matrix. The silicon oxycarbide particles have Si, O, and C in a covalently bonded network, and a dispersion of barium-magnesium alumino-silicate particles in the matrix. The barium-magnesium alumino-silicate particles have an average maximum dimension that is between about 10-40% of an average maximum dimension of the silicon oxycarbide particles. A composite material and a method of applying a barrier layer to a substrate are also disclosed.

16 Claims, 2 Drawing Sheets

(51) Int. Cl.

| | |
|---|---|
| ***C04B 35/565*** | (2006.01) |
| ***C04B 41/50*** | (2006.01) |
| ***C04B 41/52*** | (2006.01) |
| ***C04B 41/87*** | (2006.01) |
| ***F01D 5/28*** | (2006.01) |
| *C04B 103/00* | (2006.01) |
| *C04B 111/00* | (2006.01) |

(56) References Cited

U.S. PATENT DOCUMENTS

| | | | | |
|---|---|---|---|---|
| 6,787,195 | B2 | 9/2004 | Wang et al. | |
| 7,005,200 | B2 | 2/2006 | Wang et al. | |
| 8,088,699 | B2 | 1/2012 | Marlin et al. | |
| 9,212,100 | B2 | 12/2015 | Kirby et al. | |
| 10,392,312 | B2 | 8/2019 | Tang et al. | |
| 10,392,947 | B2 | 8/2019 | Kirby et al. | |
| 2013/0156958 | A1* | 6/2013 | Belov ...................... | C09D 5/00<br>427/372.2 |
| 2016/0332922 | A1* | 11/2016 | Tang ....................... | C23C 24/10 |
| 2020/0010375 | A1 | 1/2020 | Tang et al. | |
| 2020/0062664 | A1 | 2/2020 | Tang et al. | |

* cited by examiner

ENVIRONMENTAL BARRIER COATING

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to composite articles, such as those used in gas turbine engines. Components, such as gas turbine engine components, may be subjected to high temperatures, corrosive and oxidative conditions, and elevated stress levels. In order to improve the thermal and/or oxidative stability, the component may include a protective barrier coating.

SUMMARY

An article according to an exemplary embodiment of this disclosure, among other possible things includes a ceramic-based substrate and a barrier layer on the ceramic-based substrate. The barrier layer includes a matrix of SiO2 and a dispersion of silicon oxycarbide particles in the matrix. The silicon oxycarbide particles have Si, O, and C in a covalently bonded network. A dispersion of barium-magnesium alumino-silicate particles is in the matrix. The barium-magnesium alumino-silicate particles have an average maximum dimension that is between about 10-40% of an average maximum dimension of the silicon oxycarbide particles.

In a further example of the foregoing, the barrier layer includes, by volume, 1-30% of the barium-magnesium alumino-silicate particles.

In a further example of any of the foregoing, the barrier layer includes, by volume, 30-94% of the silicon oxycarbide particles.

In a further example of any of the foregoing, the barrier layer includes, by volume, 5-40% of the matrix of SiO2.

In a further example of any of the foregoing, the barrier layer includes, by volume, 1-30% of the barium-magnesium alumino-silicate particles, 5-40% of the matrix of SiO2, and a balance of the silicon oxycarbide particles.

In a further example of any of the foregoing, the barrier layer includes, by volume, 1-10% of the barium-magnesium alumino-silicate particles.

In a further example of any of the foregoing, the average maximum dimension of the barium-magnesium alumino-silicate particles is between about 5 and 30 micrometers.

In a further example of any of the foregoing, an average distance between adjacent barium-magnesium alumino-silicate particles is between about 60 and 200 micrometers.

In a further example of any of the foregoing, an average maximum dimension of the barium-magnesium alumino-silicate particles is between 8-15% of an average distance between adjacent barium-magnesium alumino-silicate particles.

In a further example of any of the foregoing, an average distance between adjacent barium-magnesium alumino-silicate particles is between about 60 and 200 micrometers.

In a further example of any of the foregoing, there is a distinct intermediate layer between the barrier layer and the ceramic-based substrate, the distinct intermediate layer including an intermediate layer matrix of SiO2 and a dispersion of intermediate layer silicon oxycarbide particles in the intermediate layer matrix.

In a further example of any of the foregoing, the matrix of SiO2 is continuous.

In a further example of any of the foregoing, the silicon oxycarbide particles have a composition SiOxMzCy, where M is at least one metal, x<2, y>0 and z<1 and x and z are non-zero.

In a further example of any of the foregoing, the article includes a ceramic-based top coat on the barrier layer.

A composite material according to an exemplary embodiment of this disclosure, among other possible things includes a matrix of SiO2 and a dispersion of silicon oxycarbide particles in the matrix. The silicon oxycarbide particles have Si, O, and C in a covalently bonded network. A dispersion of barium-magnesium alumino-silicate particles is in the matrix. The barium-magnesium alumino-silicate particles have an average maximum dimension that is between about 10-40% of an average maximum dimension of the silicon oxycarbide particles.

In a further example of the foregoing, the average maximum dimension of the barium-magnesium alumino-silicate particles is between about 5 and 30 micrometers.

In a further example of any of the foregoing, an average distance between adjacent barium-magnesium alumino-silicate particles is between about 60 and 200 micrometers.

In a further example of any of the foregoing, the average maximum dimension of the barium-magnesium alumino-silicate particles is between 8-15% of the average distance between adjacent barium-magnesium alumino-silicate particles.

A method of applying a barrier layer to a substrate according to an exemplary embodiment of this disclosure, among other possible things includes mixing particles of barium-magnesium alumino-silicate, particles of SiO2, and silicon oxycarbide in a carrier fluid to form a slurry, where the barium-magnesium alumino-silicate particles have an average maximum dimension that is between about 10-40% of an average maximum dimension of the silicon oxycarbide particles. The slurry is applied to the substrate. The slurry is dried. The slurry is cured, such that the cross-linking occurs in the composite material.

In a further example of the foregoing, the barium-magnesium alumino-silicate particles are classified prior to the mixing.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
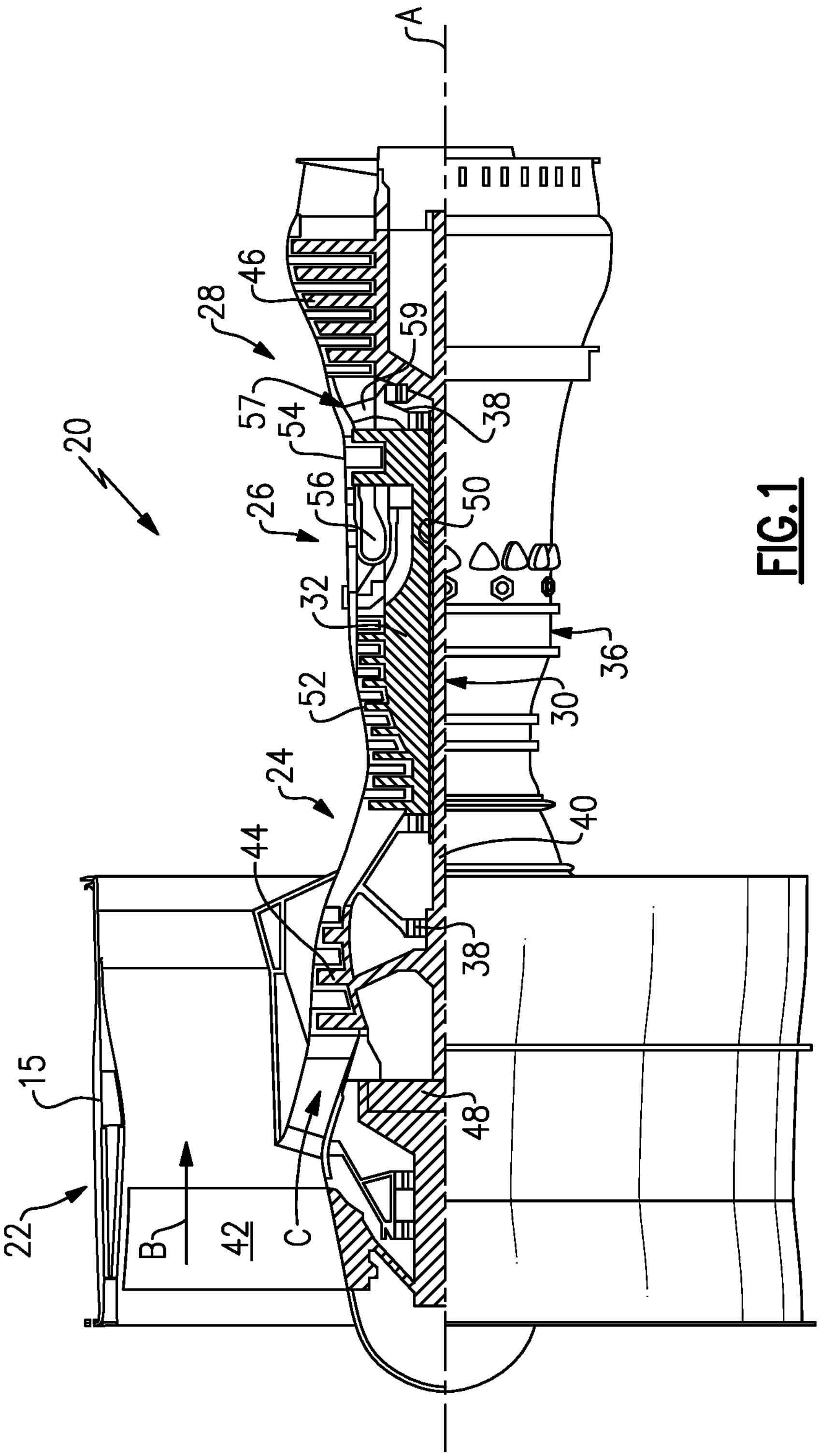
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans. A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC') "—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors. In another non-limiting example embodiment the low pressure turbine 46 includes about 3 turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors in the low pressure turbine 46 and the number of blades in the fan section 22 disclose an example gas turbine engine 20 with increased power transfer efficiency.

Figure 2:
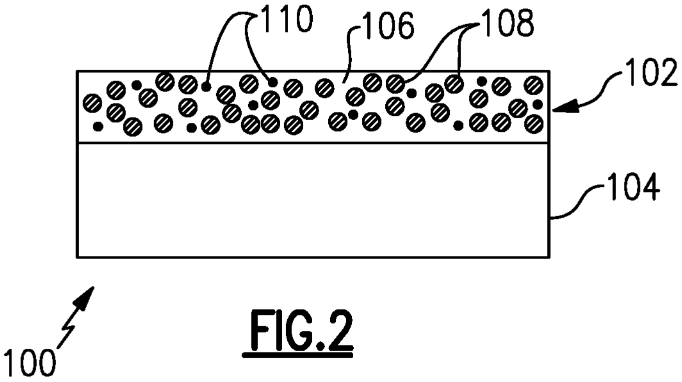
FIG. 2 illustrates an example article having a barrier layer of a composite material that includes barium-magnesium alumino-silicate particles.

FIG. 2 schematically illustrates a representative portion of an example article 100 for the gas turbine engine 20 that includes a composite material 102 that is used as a barrier layer. The article 100 can be, for example, an airfoil in the compressor section 24 or turbine section 28, a combustor liner panel in the combustor section 26, a blade outer air seal, or other component that would benefit from the examples herein. In this example, the composite material 102 is used as an environmental barrier layer to protect an underlying substrate 104 from environmental conditions, as well as thermal conditions. As will be appreciated, the composite material 102 can be used as a stand-alone barrier layer, as an outermost/top coat with additional underlying layers, or in combination with other coating under- or over-layers, such as, but not limited to, ceramic-based topcoats.

Figure 3:
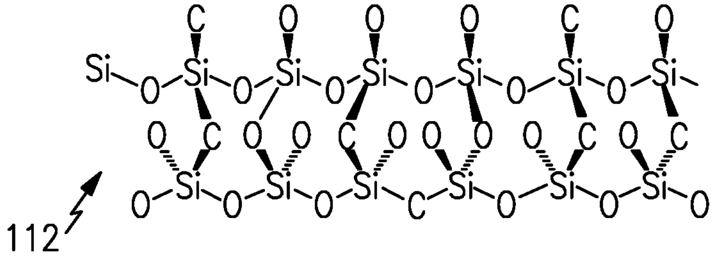
FIG. 3 illustrates a network of silicon oxycarbide.

The composite material 102 includes a matrix of silicon dioxide ($SiO_2$) 106, a dispersion of silicon oxycarbide particles (SiOC) 108 in the matrix 106, and a dispersion of barium-magnesium alumino-silicate particles 110 ("BMAS particles 110. The silicon oxycarbide particles 108 have silicon, oxygen, and carbon in a covalently bonded network, as shown in the example network 112 in FIG. 3.

The network 112 is amorphous and thus does not have long range crystalline structure. The illustrated network 112 is merely one example in which at least a portion of the silicon atoms are bonded to both 0 atoms and C atoms. As can be appreciated, the bonding of the network 112 will vary depending upon the atomic ratios of the Si, C, and O. In one example, the silicon oxycarbide particles 108 have a composition $SiO_xM_zC_y$, where M is at least one metal, $x<2$, $y>0$, $z<1$, and x and z are non-zero. The metal can include aluminum, boron, transition metals, refractory metals, rare earth metals, alkaline earth metals or combinations thereof.

In one example, the composite material 102 includes, by volume, 1-30% of the BMAS particles 110. In a more particular example, the composite material 102 includes, by volume, 1-10% of BMAS particles. In a further example, the composite material 102 includes, by volume, 30-94% of the silicon oxycarbide particles 108. In one further example, the composite material 102 includes, by volume, 5-40% of the matrix 26 of silicon dioxide. In a further example, the composite material 102 includes, by volume, 1-30% of the BMAS particles 110, 5-40% of the matrix 106 of silicon dioxide, and a balance of the silicon oxycarbide particles 108.

In one example, the silicon oxycarbide particles 108 have an average maximum dimension of 1-75 micrometers. An average maximum dimension of the BMAS particles 110 is less than the average maximum dimension of the silicon oxycarbide particles 108. In a particular example, the BMAS particles 110 have an average maximum dimension that is between about 10% and 40% of the average maximum dimension of the silicon oxycarbide particles 108. In a further example, the BMAS particles 110 have an average maximum dimension that is between about 5 and 30 micrometers.

The BMAS particles 110 are dispersed in the matrix 106. For a given amount of BMAS particles 110 in the composite material 102, the average maximum diameter of the BMAS particles 110 is proportional to an average distance d between adjacent BMAS particles 110. The average distance d is defined as the distance between centerpoints of adjacent BMAS particles 110. In some examples, the average distance d between adjacent BMAS particles 110 is between about 60 and 200 micrometers. In another example, the average maximum dimension of the BMAS particles 110 is about 8% and 15% of the average distance d. For example, the average distance d between adjacent BMAS particles 110 can be calculated from the cross section optical images of the composite material 102 using image processing technology, as would be known in the art.

The barrier layer protects the underlying substrate 104 from oxygen and moisture. For example, the substrate 104 can be a ceramic-based substrate, such as a silicon-containing ceramic material. One example is silicon carbide. The silicon oxycarbide particles 108 and the BMAS particles 110 of the barrier layer function as an oxygen and moisture diffusion barrier to limit the exposure of the underlying substrate 104 to oxygen and/or moisture from the surrounding environment. Without being bound by any particular theory, the BMAS particles 110 enhance oxidation and moisture protection by diffusing to the outer surface of the barrier layer opposite of the substrate 104 and forming a sealing layer that seals the underlying substrate 104 from oxygen/moisture exposure. Additionally, the cationic metal species of the BMAS particles 110 (barium, magnesium, and aluminum) can diffuse into the silicon oxycarbide particles 108 to enhance oxidation stability of the silicon oxycarbide material. Further, the diffusion behavior of the BMAS particles 110 may operate to seal any microcracks that could form in the barrier layer. Sealing the micro-cracks could prevent oxygen from infiltrating the barrier layer, which further enhances the oxidation resistance of the barrier layer. To this end, it has been discovered that selecting the average maximum dimension of the BMAS particles 110 and the average distance d between adjacent BMAS particles 110 (discussed above) is particularly important to improving the oxidation resistance of the barrier layer. In particular, it has been discovered that BMAS particles 110 having the average maximum dimension and average distance d between adjacent BMAS particles discussed above facilitates improving the oxidation resistance of the barrier layer.

Figure 4:
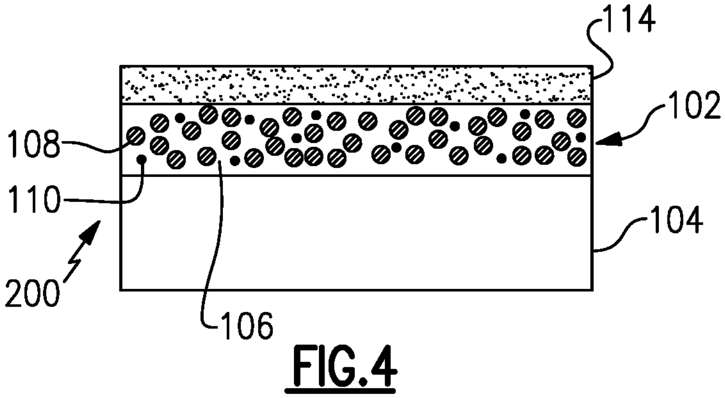
FIG. 4 illustrates another example article having a barrier layer of a composite material that includes barium-magnesium alumino-silicate particles.

FIG. 4 shows another example article 200 that includes the composite material 102 as a barrier layer arranged on the substrate 104. In this example, the article 200 additionally includes a ceramic-based top coat 114 interfaced with the barrier layer. As an example, the ceramic-based top coat 114 can include one or more layers of an oxide-based material. The oxide-based material can be, for instance, halfnium-based oxides, yttrium-based oxides (such as hafnia, hafnium silicate, yttrium silicate, yttria stabilized zirconia or gadolinia stabilized zirconia), or combinations thereof, but is not limited to such oxides.

Figure 5:
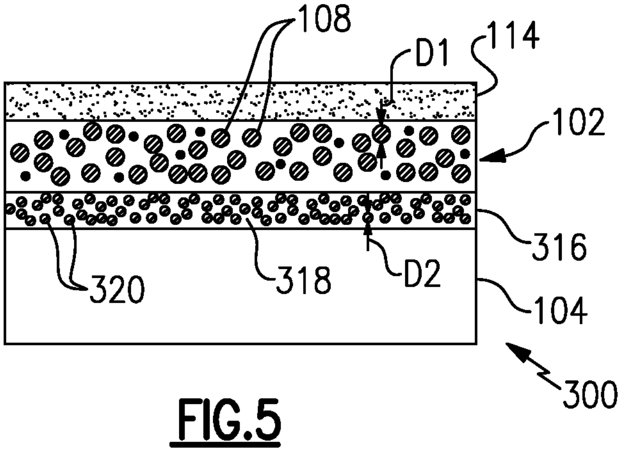
FIG. 5 illustrates another example article having a barrier layer of a composite material that includes barium-magnesium alumino-silicate particles.

FIG. 5 illustrates another example article 300 that is somewhat similar to the article 200 shown in FIG. 4 but includes a distinct intermediate layer 316 interposed between the barrier layer of the composite material 102 and the substrate 104. In this example, the distinct intermediate layer 316 includes an intermediate layer matrix 318 of silicon dioxide and a dispersion of intermediate layer silicon oxycarbide particles 320 in the intermediate layer matrix 318. The intermediate layer silicon oxycarbide particles 320 are similar to the silicon oxycarbide particles 108 in composition but, in this example, the intermediate layer silicon oxycarbide particles 320 have an average maximum dimension (D2) that is less than the average maximum dimension (D1) of the silicon oxycarbide particles 108. The relatively small intermediate layer silicon oxycarbide particles 320 provide a relatively low roughness for enhanced bonding with the underlying substrate 104. The larger silicon oxycarbide particles 108 of the barrier layer provide enhanced blocking of oxygen/moisture diffusion. Thus, in combination, the barrier layer and intermediate layer 316 provide good adhesion and good oxidation/moisture resistance. In one further example, D1 is 44-75 micrometers and D2 is 1-44 micrometers.

In one example, the intermediate layer 316 can include, by volume, 5-40% of the intermediate layer matrix 318 of silicon dioxide and a balance of the intermediate layer silicon oxycarbide particles 320. In further examples, a portion of the BMAS particles 110 from the barrier layer can penetrate or diffuse into the intermediate layer 316, during processing, during operation at high temperatures, or both. In a further example, a seal coat layer of $SiO_2$, with or without BMAS particles, can be provided between the barrier layer and the intermediate layer 316 to provided adhesion and additional sealing. In further examples of any of the compositions disclosed herein, said compositions can include only the listed constituents. Additionally, in any of the examples disclosed herein, the matrix 106 and 318 can be continuous. The two-layer structure can also demonstrate good oxidation protection at 2000-2700° F. for 500 hours or longer as well as good adhesion with the ceramic-based top coat 114.

The BMAS particles 110 can be prepared by crushing, milling, or another know method to achieve the desired average maximum dimension, as discussed above. In some examples, BMAS particles 110 can be classified to remove very small BMAS particles 110, such as BMAS particles that have a maximum dimension less than about 1 micrometer. For instance, the BMAS particles 110 can be classified using an air classification method such as fluidized bed or air spinning. Very small BMAS particles 110 can reduce the mechanical robustness of the barrier layer, and generally do not contribute to the oxidation resistance of the barrier layer.

The BMAS particles 110 can be in the glass or crystalline phase during the preparation. In some examples, the BMAS particles 110 may be in the glass phase during the preparation, and change into the crystalline phase during application of the barrier layer to the substrate 104 and/or during use of the article 100/200/300 in a gas turbine engine 20, for example.

The barrier layer and/or intermediate layer 316 can be fabricated using a slurry coating method. The appropriate slurries can be prepared by mixing components, such as silicon oxycarbide, barium-magnesium alumino-silicate, and powder of silicon dioxide or colloidal silica (Ludox) in a carrier fluid, such as water. The slurries can be mixed by agitation or ball milling and the resulting slurry can be painted, dipped, sprayed or otherwise deposited onto the underlying substrate 104. The slurry can then be dried at room temperature or at an elevated temperature to remove the carrier fluid. In one example, the slurry is dried and cured at about 100-300° C. for about 5-60 minutes. During the heating, cross-linking of the colloidal silica occurs. The green coating can then be sintered at an elevated temperature in air for a selected amount of time. In one example, the sintering includes heating at 1500° C. or greater in an air environment for at least 1 hour.

The composite material 102 can be prepared using a slurry coating method. Slurries can be prepared by mixing components such as SiOC, BMAS, $SiO_2$ or Ludox (a source colloidal $SiO_2$) and water using agitation or ball milling. Various slurry coating methods such as painting, dipping and spraying can be used to coat ceramic matrix composite (CMC) substrates. Coatings formed from slurry are dried at room temperature and cured at 300° C. for about 5-60 minutes. During the heating, cross-linking of the colloidal silica occurs. This coating process can be repeated until all layers are coated. The bond coat is finally sintered at 1500° C. in air for at least 1 hour.

In one further example, a slurry of SiOC/$SiO_2$ 75/25 vol % was prepared by mixing appropriate amounts of SiOC and Ludox colloidal silica. A small amount of water was added to adjust the viscosity. The slurry was further mixed by ball milling for at least 15 hours. A slurry of SiOC/BMAS/$SiO_2$ 80/5/15 vol % was prepared likewise by mixing appropriate amounts of SiOC, BMAS and Ludox colloidal silica and ball milling for more than 15 hours.

An inner layer was applied on a cleaned CMC substrate 104 by painting. The coating was then dried at room temperature for about 5-60 minutes and heated in oven at between about 100-300° C. for about 5-60 minutes. During the heating, cross-linking of the colloidal silica occurs. An outer layer was applied in the same fashion as the inner layer with the exception that the outer layer was applied with two passes. In between the two passes, in one example, the specimen is submerged in Ludox colloidal silica solution, air dried at room temperature and heat treated at between about 100-300° C. for about 5-60 minutes to provide a silica sealing layer. After completion of the two layer bond coat, the specimen was sintered at 1500° C. for at least 1 hour.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An article comprising:

a ceramic-based substrate; and a barrier layer on the ceramic-based substrate, the barrier layer including a matrix of $SiO_2$, a dispersion of silicon oxycarbide particles in the matrix, the silicon oxycarbide particles having Si, O, and C in a covalently bonded network, and a dispersion of barium-magnesium alumino-silicate particles in the matrix, the barium-magnesium alumino-silicate particles having an average maximum dimension that is between about 10-40% of an average maximum dimension of the silicon oxycarbide particles, wherein the average maximum dimension of the barium-magnesium alumino-silicate particles is between about 8-15% of an average distance between adjacent barium-magnesium alumino-silicate particles, and the barium-magnesium alumino-silicate particles are classified and exclude small particles that have a maximum dimension of less than 1 micrometer.

2. The article as recited in claim 1, wherein the barrier layer includes, by volume, 1-30% of the barium-magnesium alumino-silicate particles.

3. The article as recited in claim 1, wherein the barrier layer includes, by volume, 30-94% of the silicon oxycarbide particles.

4. The article as recited in claim 1, wherein the barrier layer includes, by volume, 5-40% of the matrix of $SiO_2$.

5. The article as recited in claim 1, wherein the barrier layer includes, by volume, 1-30% of the barium-magnesium alumino-silicate particles, 5-40% of the matrix of $SiO_2$, and a balance of the silicon oxycarbide particles.

6. The article as recited in claim 5, wherein the barrier layer includes, by volume, 1-10% of the barium-magnesium alumino-silicate particles.

7. The article as recited in claim 1, wherein the average maximum dimension of the barium-magnesium alumino-silicate particles is between about 5 and 30 micrometers.

8. The article as recited in claim 7, wherein an average distance between adjacent barium-magnesium alumino-silicate particles is between about 60 and 200 micrometers.

9. The article as recited in claim 1, wherein an average distance between adjacent barium-magnesium alumino-silicate particles is between about 60 and 200 micrometers.

10. The article as recited in claim 1, further comprising a distinct intermediate layer between the barrier layer and the ceramic-based substrate, the distinct intermediate layer including an intermediate layer matrix of $SiO_2$ and a dispersion of intermediate layer silicon oxycarbide particles in the intermediate layer matrix.

11. The article as recited in claim 1, wherein the matrix of SiO2 is continuous.

12. The article as recited in claim 1, wherein the silicon oxycarbide particles have a composition $SiO_xM_zC_y$, where M is at least one metal, $x<2$, $y>0$ and $z<1$ and x and z are non-zero.

13. The article as recited in claim 1, further comprising a ceramic-based top coat on the barrier layer.

14. A composite material comprising:

a matrix of $SiO_2$;

a dispersion of silicon oxycarbide particles in the matrix, the silicon oxycarbide particles having Si, O, and C in a covalently bonded network; and a dispersion of barium-magnesium alumino-silicate particles, in the matrix, the barium-magnesium alumino-silicate particles having an average maximum dimension that is between about 10-40% of an average maximum dimension of the silicon oxycarbide particles, wherein the average maximum dimension of the barium-magnesium alumino-silicate particles is between 8-15% of the average distance between adjacent barium-magnesium alumino-silicate particles, and the barium-magnesium alumino-silicate particles are classified and exclude small particles that have a maximum dimension of less than 1 micrometer.

15. The composite material as recited in claim 14, wherein the average maximum dimension of the barium-magnesium alumino-silicate particles is between about 5 and 30 micrometers.

16. The composite material as recited in claim 15, wherein an average distance between adjacent barium-magnesium alumino-silicate particles is between about 60 and 200 micrometers.

* * * * *